Feb. 8, 1944.  D. W. T. EVANS  2,340,948
DRAW BENCH GRIPPER CARRIAGE
Filed Nov. 17, 1942  2 Sheets-Sheet 2

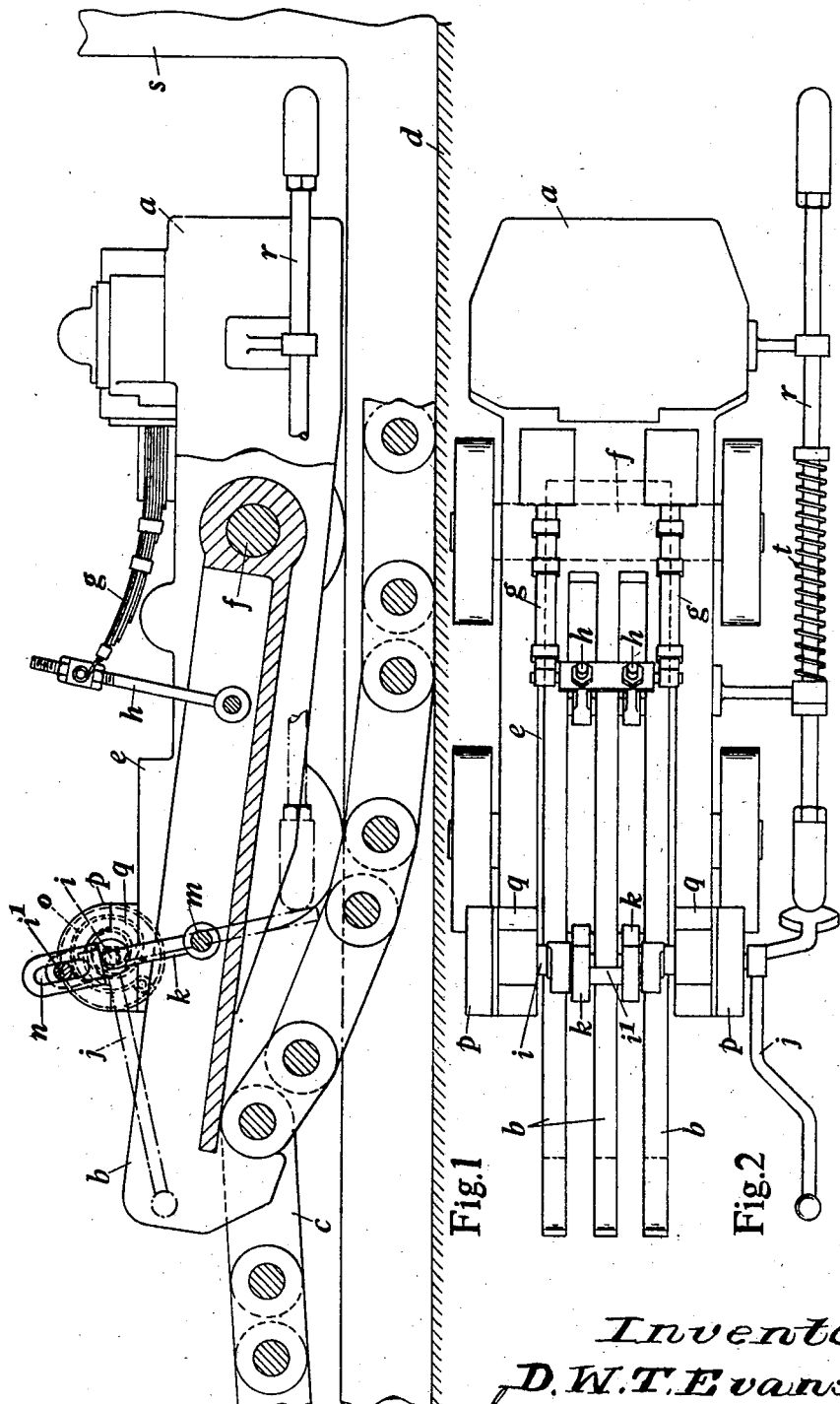

Inventor
D. W. T. Evans
By Glascock Downing Diebold Attys

Patented Feb. 8, 1944

2,340,948

UNITED STATES PATENT OFFICE 2,340,948

DRAWBENCH GRIPPER CARRIAGE

David William Thomas Evans, Sutton Coldfield, England, assignor to T. I. (Group Services) Limited, Birmingham, England Application November 17, 1942, Serial No. 465,874
In Great Britain November 21, 1941

2 Claims. (Cl. 205—24)

This invention relates to carriages used on draw benches for carrying grippers whereby tubes or other work pieces are drawn through dies, the carriages being of the kind provided with a pivoted hook for effecting connection with a chain by which the carriage is moved along the bench. The object of the invention is to provide improved means for controlling the hook.

The invention comprises the combination of an angularly movable crank mounted on the carriage, a link or links connecting the crank to the hook, and means for actuating the crank, the arrangement of the crank and link or links being such as to form a toggle-like device for supporting the hook in an upper position.

In the accompanying sheets of explanatory drawings:

Figures 1 and 2 are respectively a part sectional side elevation and a plan of a draw bench gripper carriage provided with the invention, the hook being shown in the position which it is caused to assume when in engagement with and subjected to the pull of the chain.

Figure 3:
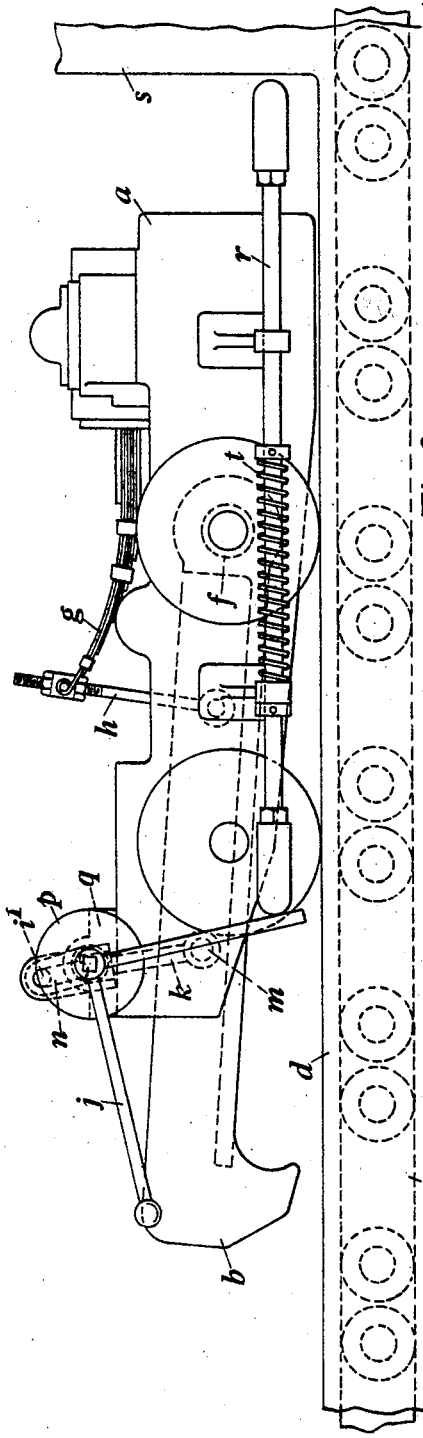
Figure 3 is a side elevation of the carriage with the hook in its inoperative position.

In the drawings $a$ indicates the carriage, $b$ the hook on the carriage, and $c$ the movable chain which lies below the carriage and which by engagement with the hook serves to move the carriage along the bench $d$ for drawing a tube or other work piece through a die (not shown), the carriage being provided with any convenient grippers (also not shown) for engaging the work piece.

In carrying the invention into effect as shown in the drawings, the forward end of the carriage $a$ is formed with a gap $e$, and the hook $b$ is arranged to lie between the sides of the gap, the rear end of the hook being attached to the carriage by a pivot pin $f$. When the hook $b$ is heavy (and it is in connection with a heavy hook that the invention is especially advantageous) the weight of the hook is counteracted by a laminated spring or springs $g$ having one end secured to the carriage $a$ adjacent to the hook pivot pin $f$ and the other end connected to an intermediate part of the hook through the medium of a link or links $h$. The action of the spring or springs $g$ may be supplemented by an additional spring or springs associated with the hook controlling means hereinafter described.

Across the forward end of the carriage $a$ and above the hook $b$ there is mounted an angularly movable crank shaft $i$, and on one end of this shaft is secured a bell-crank or other operating lever $j$ which may be operable by hand or automatically or both. The cranked portion $i^1$ of the shaft $i$ is connected to the hook $b$ by a link or a pair of links $k$ arranged side by side, the link or links being secured at one end to the hook by a pivot pin $m$. Preferably and as shown a lost-motion connection is provided between the link or links $k$ and the crank shaft $i$, this being effected by forming a slot $n$ in the end of the link or each link which embraces the cranked portion $i^1$ of the shaft.

The crank shaft $i$ is so arranged that when in its upper inoperative position (as shown in Figure 3) its cranked portion $i^1$ is situated above the axis of oscillation of the shaft, and slightly to the forward side of a vertical plane containing that axis, and the link or links $k$ extend downwardly from that portion to the hook $b$. Thus disposed the crank shaft $i$ and link or links $k$ form a toggle-like device for supporting the hook $b$ in its upper inoperative position. To allow the hook $b$ to drop into engagement with the chain $c$, the crank shaft $i$ is moved so as to carry its cranked portion $i^1$ to the other side of the vertical plane above-mentioned, a relatively small force applied to the crank shaft being sufficient to effect this movement, and after the cranked portion has passed through this plane the weight of the hook causes the continued movement necessary to enable the hook to engage the chain as shown in Figure 4.

Preferably and as shown I combine with one or each end of the crank shaft $i$ a spring or springs as $o$ for supplementing the action of the above-mentioned spring or springs $g$ in counteracting the weight of the hook $b$. The spring or each spring $o$ is conveniently in the form of a coiled strip and is arranged in a housing $p$ at one side of the adjacent crank shaft bearing $q$, one end of the spring being secured to the crank shaft $i$ and the other to the housing. Any convenient means may also be provided for adjusting the tension of the spring or each spring $o$.

As already mentioned the crank lever $j$ may be operable by hand or automatically or both. To effect automatic actuation of this lever in the example shown a tappet device in the form of a spring-loaded rod $r$ is mounted horizontally on one side of the carriage $a$ between the lever and the die holder s. When the carriage a is brought to its initial position the rod r is moved axially against the action of its loading spring t by contact of one end of the rod with the die holder s, this movement of the rod serving to actuate the lever j for bringing the toggle-like device i, k into a position in which the hook b can drop into engagement with the chain c as previously described. Alternatively a stop may be mounted on the bench for engaging and actuating the lever.

Figure 4:
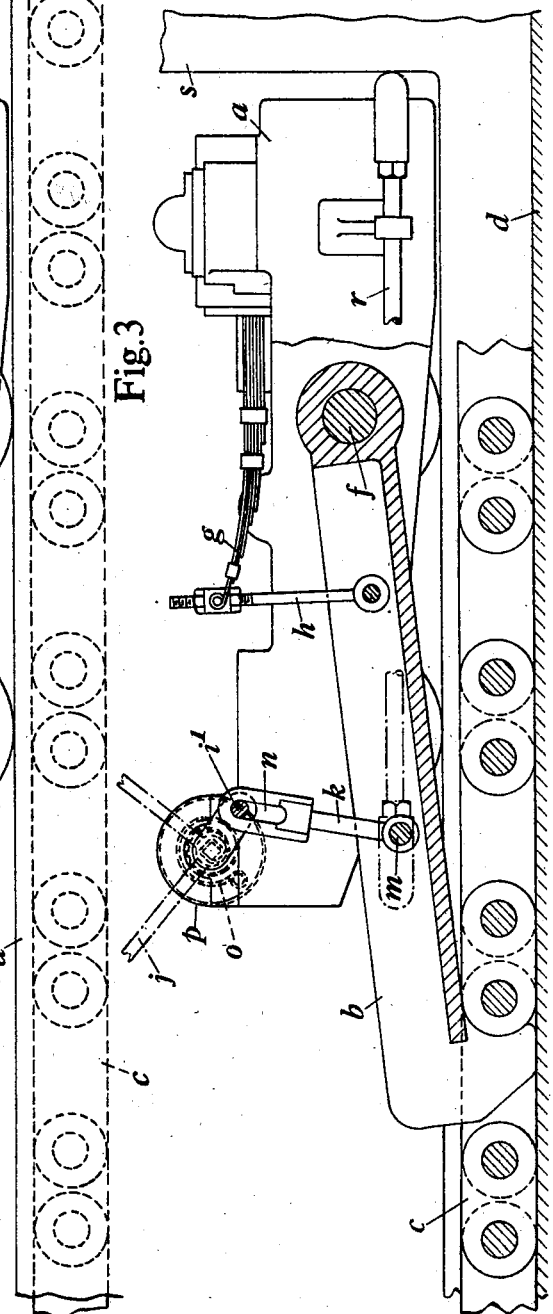
Figure 4 is a similar view to Figure 1 showing the hook in the position into which it can drop for engagement with the chain.

Assuming that the toggle-like device i, k, has been so actuated as to allow the hook b to engage the chain c as shown in Figure 4, the effect of the pull of the chain on the hook is to cause the portion of the chain engaged by the hook to be deflected upwardly, so causing the hook to rise and the toggle-like device to take up the previously described position in which it can retain the hook, this condition being shown in Figure 1. The hook b and chain c remain in this condition so long as the pull required to draw the work piece through the die is being exerted. As soon as the rear end of the work piece has passed through the die this pull is relaxed, and the deflected portion of the chain c falls away from the hook b, leaving the latter in its upper inoperative position (as shown in Figure 3) in which it is retained by the toggle-like device i, k. Later the carriage a is returned to its initial position by or under the control of the bench attendant, and re-engagement of the hook b with the chain c for the next operation is effected by movement of the lever j either by the attendant or automatically as above described.

Whilst the invention is primarily intended for use on large draw benches on which heavy hooks are employed, it is also applicable with advantage to smaller benches, as it enables the hook to be controlled either manually or automatically in a very convenient manner. The invention is therefore not limited to the example described as subordinate details may be varied to suit different requirements.

Having thus described my invention what I claim as new and desire to secure by Letters Patent is:

1. A draw bench gripper carriage having in combination a pulling hook pivoted on the carriage and movable between a lower operative position and an upper inoperative position, an angularly movable crank shaft mounted on the carriage, at least one link connecting the crank shaft to the hook and forming with the crank shaft a toggle-like device for supporting the hook in its upper inoperative position, and means for actuating the crank shaft.

2. A draw bench gripper carriage as claimed in claim 1 and having in combination with the crank shaft at least one spiral spring for counter-acting in part the weight of the hook.

DAVID WILLIAM THOMAS EVANS.